United States Patent [19]

Liebal et al.

[11] 4,203,753
[45] May 20, 1980

[54] TURRET GLASS PRESS

[75] Inventors: Eberhard Liebal, Kronach; Norbert Eichenberg, Michelau, both of Fed. Rep. of Germany

[73] Assignee: Messrs. J. Walter Co. Maschinen GmbH, Kronach, Fed. Rep. of Germany

[21] Appl. No.: 961,940

[22] Filed: Nov. 20, 1978

[30] Foreign Application Priority Data

Nov. 26, 1977 [DE] Fed. Rep. of Germany ....... 2752814

[51] Int. Cl.² .................. C03B 11/02; C03B 11/16
[52] U.S. Cl. .......................................... 65/163; 65/309
[58] Field of Search ............... 65/160, 163, 305, 311, 65/241, 309

[56] References Cited

U.S. PATENT DOCUMENTS

| | | | |
|---|---|---|---|
| 1,024,116 | 4/1912 | Burrows | 65/229 X |
| 2,254,992 | 9/1941 | Bridges | 65/241 X |
| 2,991,531 | 7/1961 | Gates | 65/305 X |
| 3,362,807 | 1/1968 | Wiley | 65/241 X |
| 3,418,096 | 12/1968 | Bathellier | 65/160 X |
| 3,574,587 | 4/1971 | Grundy et al. | 65/160 X |
| 4,062,668 | 12/1977 | Zappia | 65/241 X |

*Primary Examiner*—Richard V. Fisher

[57] ABSTRACT

In a turret press for moulding glass, a turntable is equipped with a plurality of equally circumferentially spaced mould-receiving stations which move past stationary operating stations comprising at least one glass charging station, at least one glass pressing station and at least one product withdrawing station. The turntable is driven by a Maltese cross mechanism connected to a continuously running motor by a clutch and brake device. Scanners provided for uncoupling and braking the Maltese cross mechanism are disposed at each said operating station to co-operate with actuators of the mould-receiving stations on the turntable. Any one actuator is operative to co-operate with the scanners only when a mould is present at the respective mould-receiving station.

12 Claims, 3 Drawing Figures

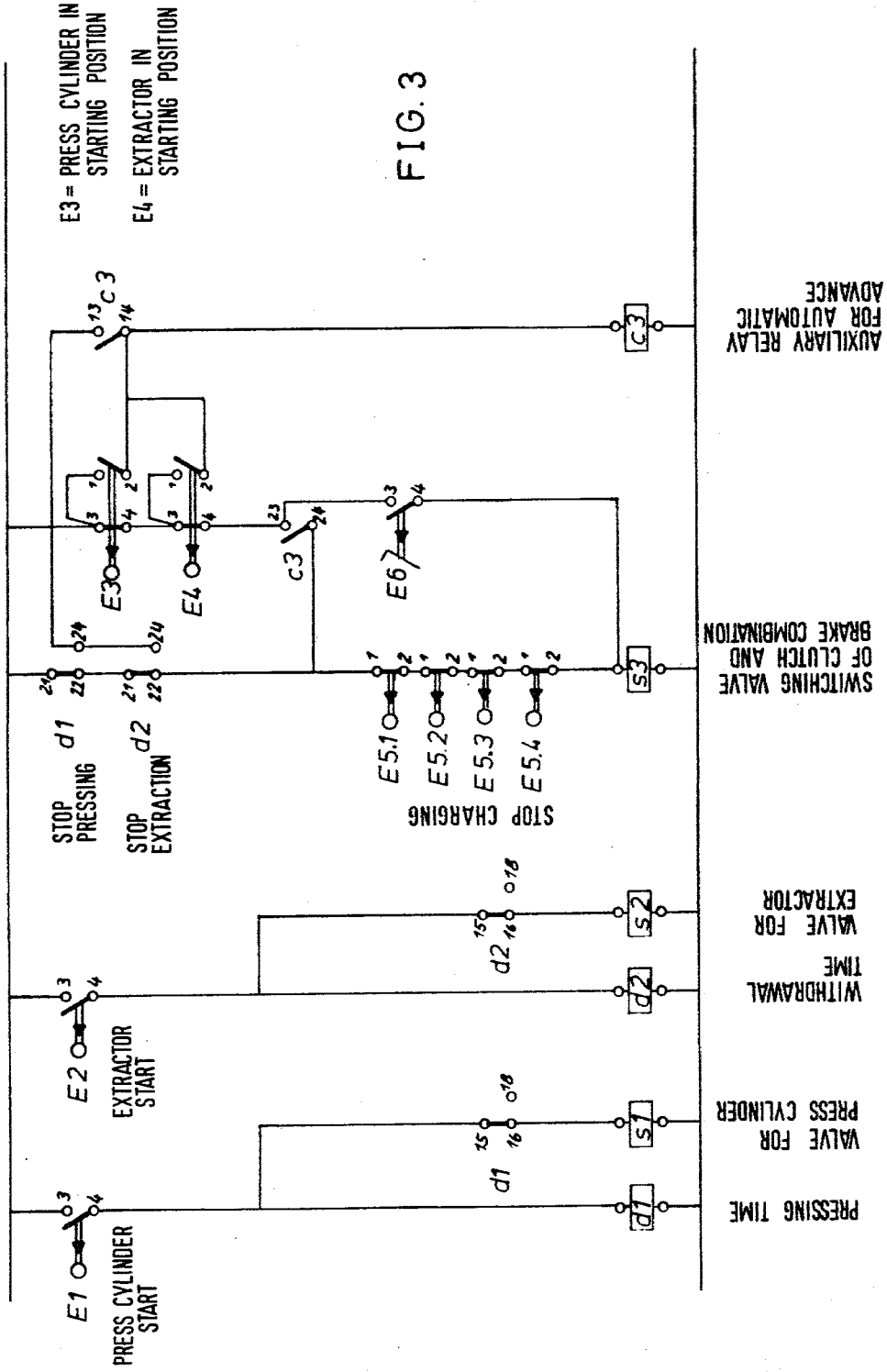

TURRET GLASS PRESS

The invention relates to a turret glass press comprising a turntable having a plurality of equally circumferentially spaced mould-receiving stations, operating stations which are stationary with respect to the rotary motion of said turntable for charging the glass into the moulds, pressing the glass charged into the moulds and withdrawing the pressed or moulded glass products from the moulds, and a Maltese cross mechanism (also known as a Geneva mechanism) connected to a continuously running motor for driving said turntable.

When pressing glass, the charging step itself and the time elapsing between charging and pressing are particularly significant. The heated and fluent glass must be so hot as it is run into the mould that when the stream of glass is cut off the resultant cut will still be fluent so that the position of severing will be absolutely invisible in the end product. Once the glass has been charged into the mould, the pressing operation must follow as rapidly as possible because otherwise the glass will form waves and flow lines which remain visible in the finished article. Quite apart from this, the glass must not cool off excessively before the pressing operation because otherwise it would not even be possible to execute the pressing operation. Thus, to enable the production of glass products which are free from faults, a precisely defined and particularly short period must be maintained between charging and pressing.

In the turret glass press as outlined above, the prior art makes provision for the following: First, the charging station is disposed upstream of the pressing station at an angular spacing therefrom that is accurately equal to the angular spacing between two successive mould-receiving stations. The advance of the turntable is rigidly prescribed by the Maltese cross mechanism and is equal to the angular spacing between two successive mould receiving stations. The Maltese cross mechanism comprises a plate and a single arm which is in operative engagement with the plate for about one half of a revolution and is disengaged therefrom during the remaining half revolution. The Maltese cross mechanism is permanently coupled to a continuously running motor. Consequently, the time for one advancing motion of the turntable as defined by one cycle of the Maltese cross mechanism is governed by the motor speed. This clearly also fixes the interval between successive advancing motions during which the turntable is stationary. If one increases the speed of the steps of the Maltese cross mechanism by increasing the motor speed, one also reduces the standstill periods and vice versa. As a result, and as will hereinafter be described in more detail, all the mould-receiving stations of hitherto known glass presses must in fact be equipped with a mould.

The sequence of operations is then as follows. One mould arrives at the charging station to be filled with glass either automatically or by manual control. Since the Maltese cross mechanism continues to run, only the predetermined standstill period is available for this particular operation and one must adapt to the available time even if the charging is done by hand. Now, after each advancing step of the turntable the Maltese cross mechanism will automatically stop during the predetermined standstill period even though the motor continues to run. The glass is then pressed when the mould is located at the pressing station, the latter being automatically started and controlled in synchronism with stopping of the turntable by means of a time governor which is driven by the turning motor. At the same time, the pressed glass product is withdrawn from a mould at a withdrawing or extraction station that is disposed several steps downstream of the pressing station, the withdrawal station being likewise started to operate by the time governor so as to be in synchronism with halting of the turntable.

In practice, it has now been found desirable to have a free hand in selecting the occupation of the mould receiving station, i.e. selecting the number of moulds and the sequence in which they follow each other. For example, it should be possible to leave every second mould receiving station unoccupied. However, in the case of known turret glass presses this is not possible if only for the reason that with a lower number of occupied mould receiving stations the output rate would be correspondingly lower. After each step corresponding to the angular spacing between two adjacent mould receiving stations, the turntable of known turret glass presses will stop for the predetermined standstill period in the manner explained above. It would also stop even if only unoccupied mould-receiving stations were to be disposed opposite all the operating stations. If one were now to shorten the time cycle, one would also automatically reduce the standstill period and, although this may be desirable when there is an unoccupied mould-receiving station at an operating station, it can be most undesirable if a mould is actually disposed at an operating station. This is because a certain minimum time must be available to enable the appropriate operations to be carried out at the operating stations. In principle, therefore, the number of cycles executed by the Maltese cross mechanism per minute cannot be increased so as to maintain a high output rate even if some of the mould-receiving stations are unoccupied.

It is an object of the present invention to develop a turret glass press of the aforementioned kind so that the mould-receiving stations can be provided with moulds at will without thereby markedly limiting the output rate.

According to the invention, the Maltese cross mechanism is connected to the continuously running motor by way of a clutch and brake device, and scanners for uncoupling and braking the Maltese cross mechanism are provided at the operating stations to co-operate with an actuator which is provided at each mould-receiving station and is operative in the presence of a mould at that station but inoperative in the absence of a mould.

By using a clutch and brake device between the continuously running motor and the Maltese cross mechanism, one can now obtain short cycle periods with any desired standstill periods. Further, since scanners at the operating stations actuate the clutch and brake device, the standstill periods are adapted to particular conditions, that is to say relatively long standstill periods when an occupied mould-receiving station is opposite an operating station and practically no standstill period at all when unoccupied mould-receiving stations are opposite the operating stations. It should be noted that the cycle period remains unaffected by this and can be changed at any time by altering the driving speed of the Maltese cross mechanism.

Desirably, the Maltese cross mechanism comprises a slotted plate fixed to the turntable and engageable by a drive arm seated on an output shaft of a worm drive connected to the motor by way of the clutch and brake device. If the drive arm is equipped with two rollers instead of only one, one such roller being disposed at each end of what will then be a double acting drive arm, the number of cycles per unit time can be doubled for the same rotary speed of the drive shaft of the arm. At the same time, more uniform rotation is obtained with an uninterrupted connection between the Maltese cross mechanism and the motor in so far that there is practically no residual period between the individual steps of the cycle because as soon as one of the rollers disengages the plate of the Maltese cross mechanism the other roller is about to engage same.

By reason of the fact that scanners for coupling and braking the Maltese cross mechanism are provided at the operating stations to co-operate with actuators disposed at the mould-receiving stations and operative only if the respective stations are occupied by a mould, the turntable will not be stopped for a prolonged period after every step, i.e. each time a mould-receiving station is opposite an operating station, but only if the associated mould-receiving station is actually occupied by a mould. If this were not so, then the unnecessary standstill periods at the operating stations would reduce the output rate despite the high speed of the cycles.

The scanners are preferably in the form of limiting switches and the actuators are preferably cams which can be moved to advanced and retracted positions and locked in these positions. Of course it is also conceivable to replace the contact limiting switches with contact-free limiting switches. Each of the aforementioned cams is preferably movable automatically in response to the presence or absence of a mould at the respective mould-receiving station.

If the scanners and actuators are disposed beneath the turntable, they will be in an unobstructing and protected position.

Further, for fully automatic operation the operations at the respective operating stations are desirably initiated by the same scanners that are provided for uncoupling and braking the Maltese cross mechanism. Further limiting switches provided at the operating stations can then automatically ensure coupling of the Maltese cross mechanism after termination of the respective operation at the operating station, these limiting switches being connected so that the Maltese cross mechanism can be coupled only when the operation has been completed at each operating station. The standstill period of the turntable will then depend only on the actual carrying out of the operation that takes the longest. It is not, as in the prior art, rigidly prescribed but depends on occupation of the mould-receiving stations and the stopping position of the turntable. If, for example, unoccupied mould-receiving stations are disposed at the charging station and at the pressing station, but an occupied mould-receiving station is disposed at the withdrawing station, the standstill period can, with manual charging, be made dependent only on the withdrawing step which is often performed much more rapidly than the pressing step.

Since the press according to the invention need not have every mould-receiving station occupied by a mould, it is also not necessary to dispose the charging station at an angular spacing from the pressing station equal to the angular spacing between two adjacent mould-receiving stations, i.e. equal to the length of one step. If only every alternate mould-receiving station is occupied by a mould, it has been found advantageous with a view to obtaining a high output rate for the charging station to be disposed upstream of the pressing station at an angular spacing corresponding to a double step or twice the angular spacing between two successive mould-receiving stations. To permit selection of the charging station in this respect, one embodiment of the invention provides for the charging station to be associated with a selector switch which is operable in three steps and carries two of said scanners at its ends, the scanners co-operating with either one or the other of two adjacent mould-receiving stations at the two end steps and with neither at the intermediate step. Since the use of the Maltese cross mechanism permits the turntable to be driven in either direction, the charging station can be selectively disposed at either side of the pressing station, in which case one selector switch is provided on each side of the pressing station and the two selector switches are intercoupled so that one is at the intermediate step when the other is at either end step.

It will be evident from the above-described embodiments concerning the selector switch that the intermediate step of the selector switch is not absolutely essential and could be omitted if only a single selector switch is provided.

In the same way as for the charging station, it can, with a view to obtaining a high output rate for a press with optionally occupied mould-receiving stations, be advantageous for the withdrawing station to be displaceable in relation to the turntable in steps equal to the angular spacing between two adjacent mould-receiving stations. This is readily possible even for fully automatic operation because operation of the withdrawing station is not inherently prescribed to be in synchronism with the drive for the turntable but is instead controlled by the scanner disposed at the withdrawing station for uncoupling and braking the Maltese cross mechanism.

In this connection, it is desirable for the withdrawing station to be displaceable by a boom pivotable at the centre of the turntable, thereby enabling the cooling-off time to be varied.

It will be evident from the foregoing that the invention permits a multiplicity of different operations for a turret glass press. This versatility is obtained if the press according to the invention is equipped with a Maltese cross mechanism and scanners are provided at the operating stations for interrupting the drive to the turntable.

Other advantages and features of the invention will become evident from the following description of an example with reference to the accompanying drawings, wherein:

FIG. 3 is an operational diagram explaining the control of the FIGS. 1 and 2 press.

Figure 1:
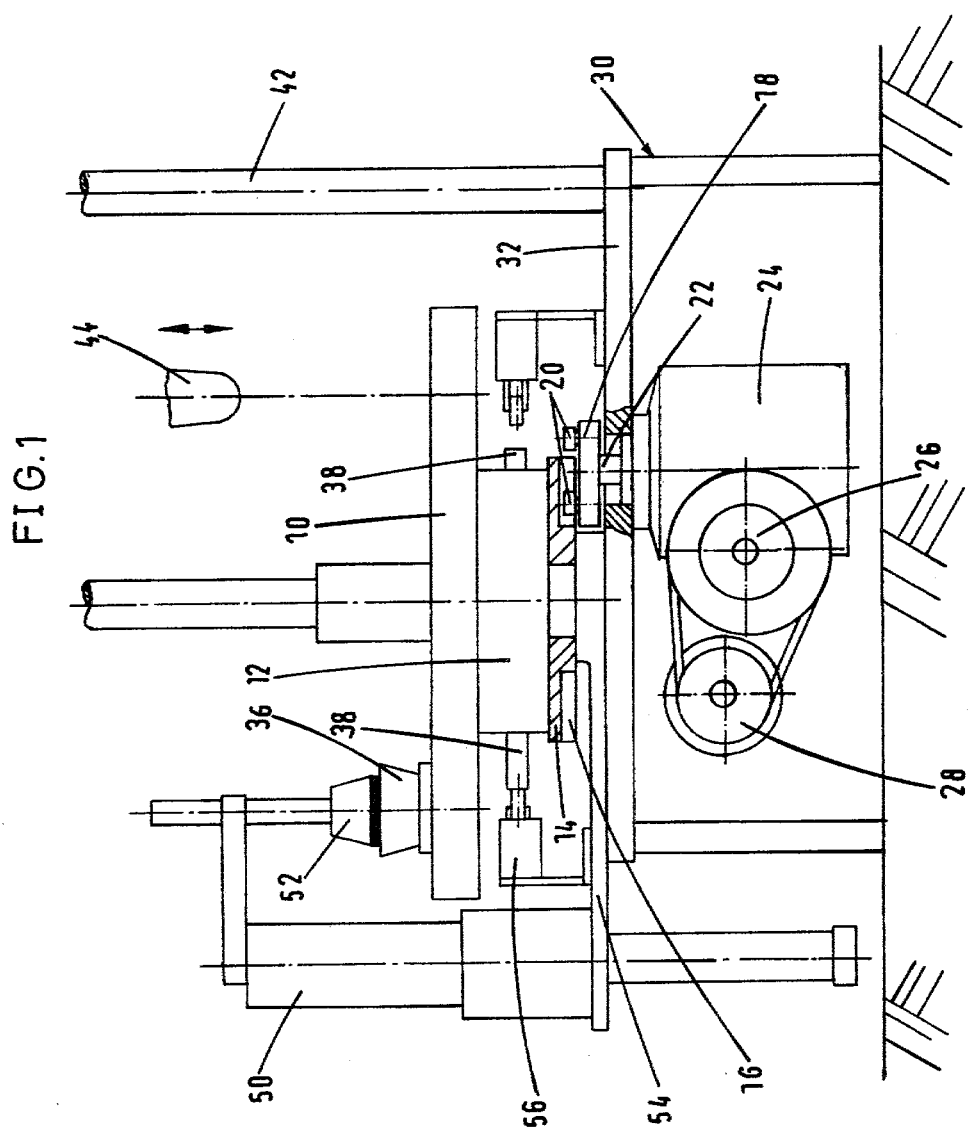
FIG. 1 is a diagrammatic side elevation of a turret glass press according to the invention.
Figure 2:
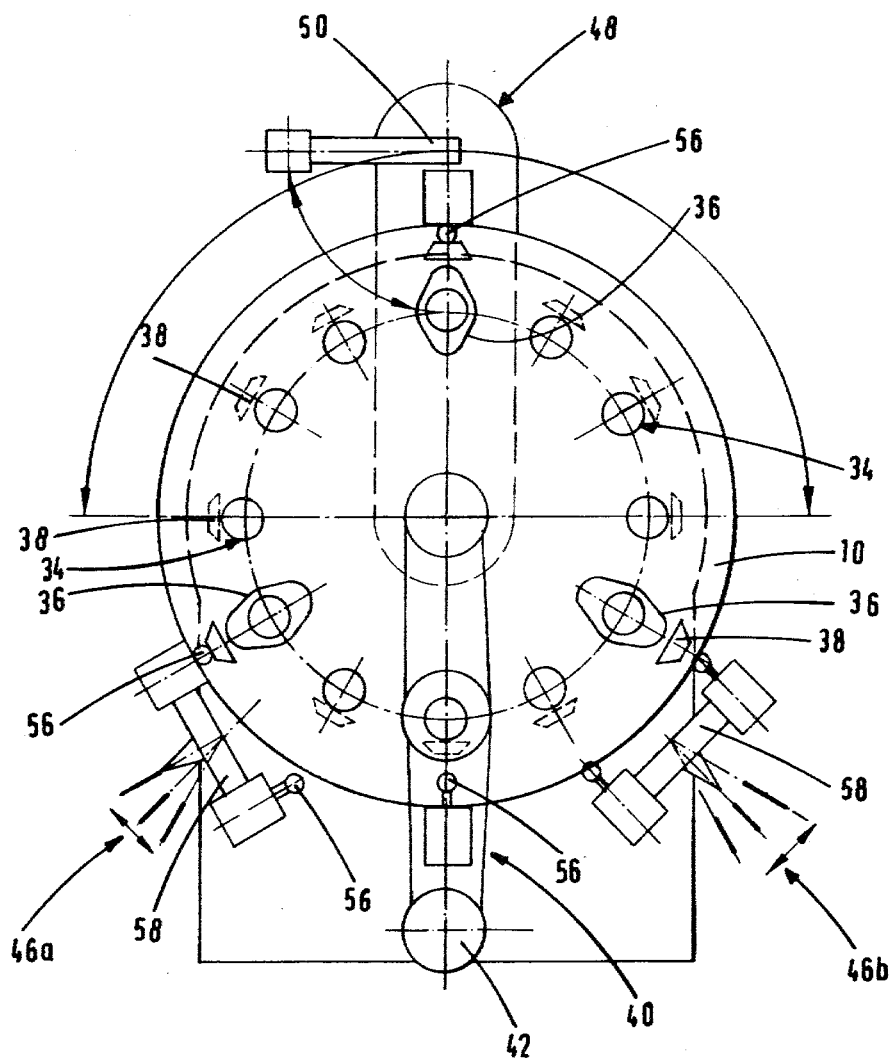
FIG. 2 is a plan view of the FIG. 1 press.

Reference will first be made to FIGS. 1 and 2. The turret glass press illustrated therein comprises a turntable 10 fixed to a rotary foot 12. The rotary foot 12 is in turn fixed to the slotted plate 14 of a Maltese cross mechanism. The plate 14 contains radial slots 16 engaged during rotation of the Maltese cross mechanism by rollers 20 at the ends of a double-acting arm 18 of the mechanism. The Maltese cross mechanism as such is known and will therefore not be described in detail. The drive shaft 22 of the drive arm 18 is driven by worm gearing 24. The worm gearing 24 is connected to a pneumatic clutch and brake device 26 which is connected by a belt drive to a constantly running drive motor 28. The turret glass press is mounted on a frame 30, the Maltese cross mechanism, including its drive arm 18, being disposed above the base plate 32 of the frame 30 whereas the worm gearing 24, the pneumatic clutch and brake device 26 and the drive motor 28 are disposed below the base plate 32. The turntable 10 of the present example is equipped with a total of 12 mould-receiving stations 34 which are arranged at equal angular spacings from each other as is shown in FIG. 2. The mould-receiving stations can be occupied or equipped with moulds 36 in any desired manner. In the particular illustrated example, every fourth mould-receiving station is occupied by a mould 36. The mould-receiving stations 34 are associated with movable cams 38. These cams are disposed beneath the turntable 10 on the rotary foot 12. The cams 38 can be projected from and retracted into the rotary foot and locked in their respective end positions. Projection and retraction of the cams 38 depends on whether or not the associated mould-receiving stations 34 are occupied by a mould. FIGS. 1 and 2 show clearly that only those cams 38 are projected for which the associated mould-receiving station 34 is occupied by a mould 36.

The operating stations are arranged about the turntable, namely at least one charging station, one pressing station and one withdrawing station. The pressing station is designated 40. It is fixed to the frame 30 and has a column 42 which carries the pressing equipment (not shown). Only the pressing piston 44 is diagrammatically indicated in FIG. 1. Upstream and downstream of the pressing station one can selectively provide a charging station 46a or 46b, which is also not shown in detail and is basically known, as is the pressing station 40. The withdrawing station is designated 48 and likewise basically known. It comprises a raisable and lowerable extractor 50 which can also be swung through 90° and which carries a suction head 52 for extracting the finished glass product. What is novel, is the arrangement of the extractor 50 on a boom 54 which is concentric with the turntable 10 between the plate 14 and base frame 32 and can be pivoted through 180° so that the position of the withdrawing station 48 can be varied with respect to the charging station 46a or 46b as well as with respect to the pressing station 40. The withdrawing station, pressing station and charging station are spaced apart by a distance equal to or a multiple of the angular spacing between two adjacent mould-receiving stations 34 so that, when a mould-receiving station 34 comes to lie at an operating station, a respective mould-receiving station will also come to lie opposite the other operating stations. Now, according to the invention the operating stations which are stationary with respect to the rotary motion of the turntable 10 are equipped with contact switches 56 which co-operate with the movable cams 38 at the mould-receiving stations. If the movable cam 38 is projected or advanced—and only then—it can actuate a contact limiting switch 56. The limiting switches 56 are connected to the pneumatic clutch and brake device 26 in such a way that they cause the worm gearing 24 to be uncoupled and braked when they are engaged by a cam 38. The turntable will then stop immediately.

In the illustrated example, a particular embodiment of the invention provides for two limiting switches 56 to be associated with each of the charging stations 46a, 46b. The two limiting switches 56 of one charging station are provided at the end of a three-step selector switch 58. In one of its end steps, the selector switch 58 brings the respective limiting switch 56 into the path of movement of the projected cam 38, the other limiting switch 56 being disposed beyond the path of movement of the projected cams 38. In the other end step, exactly the opposite takes place. In the intermediate step of the selector switch 58, neither of the two limiting switches 56 is in the path of movement of the projected cams 38. Since the limiting switches 56 are disposed on the selector switch 58 at a spacing corresponding to one advancing motion of the turntable or the angular spacing between two adjacent mould-receiving stations, one can in this way displace the charging station through the angular spacing of two adjacent mould-receiving stations 34. Instead of being disposed one step away from the pressing station 40 as is conventional in the prior art, the charging station can also be disposed two steps away from the pressing station 40 as is illustrated in FIG. 2 and as has been found desirable for the illustrated arrangement where only every fourth mould-receiving station 34 is occupied by a mould.

Since the turntable 10 can be rotated in either direction with the aid of the Maltese cross mechanism, two charging stations 46a, 46b are provided on both sides of the pressing station 40 in the manner already described, the charging station upstream of the pressing station 40 being the one that is put in operation. Now, to ensure that the charging station that is not required definitely remains inoperative, it is appropriate to intercouple the two selector switches 58 associated with the two charging stations 46a, 46b, namely so that the one selector switch will automatically be at the intermediate step when the other selector switch is in either of the end steps.

A more detailed description will now follow of the control for the turret glass press for automatic operation. To differentiate between the individual limiting switches 56, these are differently identified in FIG. 3. The limiting switch E1 is associated with the pressing station 40, the limiting switch E2 with the withdrawing station 48 and the limiting switches E5.1–E5.4 with the charging stations 46a, 46b. Further, the pressing station is associated with another limiting switch E3 which detects actuation of the press cylinder whereas the withdrawing station is associated with a further limiting switch E4 which detects the withdrawing operation. The limiting switch E1 with its contacts 3, 4 is in series with a time relay d1 between two live main supply lines. The time relay d1 is in shunt with a magnetic valve s1 to control the press cylinder in series with the delay contacts 15, 16 of the time relay d1. Similarly, the limiting switch E2 is in series with a time relay d2 between the live main lines. The time relay d2 is in shunt with a magnetic valve s2 for actuating the extractor 50 in series with the delay contacts 15, 16 of the time relay d2. The immediate contacts 21, 22 of the time relays d1, d2, as well as the contacts 1, 2 of the limiting switches E5.1–E5.4 and a switching valve s3 of the clutch and brake device 26 are in series, this series circuit likewise being connected between the live main lines. Each time relay d1, d2 is associated with a further immediate contact 24, operation being between the immediate contacts 22 and 24. The two immediate contacts 24 of the time relays d1 and d2 are interconnected and in series with an auxiliary relay c3 connected at the end remote from the immediate contacts 24, 24 of the time relays d1, d2 to one of the live main lines. A pair of contacts 13, 14 of the auxiliary relay c3 is disposed between it and the immediate contacts 24, 24 of the time relays d1, d2.

The contacts 3, 4 associated with the respective limiting switches E3, E4 are in series with each other and with a further pair of contacts 23, 24 of the auxiliary relay c3, its rest contact 24 being connected between the series circuit of the immediate contacts 21, 22 of the two time relays d1 and d2 and the series circuit of the limiting switches E5.1–E5.4. The operating contact 23 of the auxiliary relay c3 is connected by way of a limiting switch E6 between the series circuit of limiting switches E5.1–E5.4 and the switching valve s3. The other end of the series circuit of contacts 3, 4 of the limiting switches E3 and E4 is connected to one of the live main lines. The limiting switches E3, E4 each comprise a second pair of contacts 1, 2, which is open when the first pair of contacts is closed, and vice versa. The operating contact 1 of the second pair of contacts is respectively connected to those contacts 3, 3 of the first pair of contacts of the limiting switches E3, E4 which face the main line whereas the rest contacts 2, 2 of the second pair of contacts are together connected to the rest contact 14 of the auxiliary relay c3.

After a voltage has been applied to the two main lines, the turret glass press starts automatically provided that there is no mould at any of the withdrawing station (limiting switch E1 open), the pressing station (limiting switch E2 open) and charging station (limiting switches E5.1–E5.4 closed) and the press cylinder and extractor are in the starting position (limiting switches E3 and E4 depressed, contact pairs 3 and 4 closed, contact pairs 1 and 2 open, as is illustrated). The switching valve s3 is then acted upon so that the clutch and brake device is engaged.

If there is a mould opposite the charging station that has been selected by the selector switches 58, then one of the limiting switches E5.1–E5.4 is open, and the press cannot start. In this case the machine can be started by closing the normally open limiting switch E6 provided that the press cylinder and extractor are in their starting position. If there is a mould at either or both of the pressing and withdrawing stations, the appropriate operations are immediately initiated by way of the limiting switches E1 and E2 and the magnetic valves s1 and s2. Since one or both of the time relays d1 and d2 are simultaneously acted upon, the associated immediate contacts 21, 22 are open so that in each case the switching valve s3 is de-energised and the clutch and brake device is in the uncoupled condition. Return of the press cylinder and extractor to their starting position is effected in relation to time by way of the delay contacts 15, 16 of the time relays d1 and d2.

It will now be assumed that the turntable moves and the switching valve s3 for the clutch and brake device is thus acted upon. As soon as a mould reaches, say, the pressing station, the limiting switch E1 is depressed and the time relay d1 is energised. The switching valve s3 is then de-energised by way of the associated immediate contacts 21, 22 so that the turntable stops without delay. However, at the same time as the time relay d1 the magnetic valve s1 is also acted upon so that the press cylinder moves away. Withdrawal of the press cylinder frees the limiting switch E3. Its second pair of contacts 1, 2 therefore closes and its first pair of contacts 3, 4 opens. The auxiliary relay c3 is energised. Its contacts 13, 14 and 23, 24 therefore close. After expiry of the time set on the time relay d1, its delay contacts 15, 16 open and the magnetic valve s1 is de-energised. The press cylinder returns to its starting position. As soon as the press cylinder has reached its starting position, the limiting switch E3 is pressed. The associated contacts 3, 4 close whilst the associated contacts 1, 2 open. Since the auxiliary relay c3 is still energised (it has a voltage applied to it by way of the contacts 21, 24 of the time relay d1 and by way of its contacts 13, 14), the switching valve s3 can now be energised by way of the contacts 3, 4 of the limiting switch E3, the contacts 3, 4 of the limiting switch E4, the contacts 23, 24 of the auxiliary relay C3 and the contacts 1,2 of the limiting switches E5.1–E.4 so as to effect coupling. As soon as the mould turns away from the pressing station, the limiting switch E1 is released and the contacts 3, 4 open. This de-energises the time relay d1 and its immediate contacts 21, 22 are closed. Since its contacts 21, 24 are then open, the auxiliary relay c3 drops off.

A new operating cycle can now commence.

The switching operations take place in a similar manner when the mould arrives at the withdrawing station, i.e. when the limiting switch E2 is pressed. Nothing alters very much if a mould arrives at the withdrawing station as well as the pressing station and both the limiting switches E1 and E2 are pressed and this will be evident to a man skilled in the art with the aid of the forgoing description. In this case, automatic starting of the turntable will commence only when the press cylinder as well as the extractor are back in their starting positions, i.e. both limiting switches E3, E4 are pressed.

Automatic starting or resumed motion of the turntable is suppressed if a mould is at the charging station, i.e. one of the limiting switches E5.1–E5.4 (depending on the choice of charging station) is open. In this case the press has to be restarted from the outside by way of the limiting switch E6. The limiting switch E6 can be actuated by the so-called starter, who is the man standing at the charging station and responsible for charging. However, it can also be operated for example by way of a time relay or in conjunction with a fully automatic supply and charging apparatus in synchronism with the latter.

We claim:

1. A turret glass press comprising a turntable having means forming a plurality of equally circumferentially spaced mould-receiving stations, means forming operating stations which are stationary with respect to the rotary motion of said turntable for charging glass into moulds in said mould receiving stations, for pressing glass charged into the moulds, and for withdrawing the pressed glass from the moulds, a Maltese cross mechanism connected to said turntable for rotating the same, a clutch and brake device connecting said Maltese cross mechanism to a continuously running motor for driving said mechanism, scanners for uncoupling and braking said Maltese cross mechanism and provided at said means forming said operating stations, and an actuator provided at each means forming said mould-receiving station and connected to said scanners so as to be operative in the presence of a mould at said last-mentioned station.

2. The press defined in claim 1, wherein said scanners are in the form of limiting switches and said actuators are cams which can be moved to projected and retracted positions and locked in said positions.

3. The press defined in claim 2, wherein each cam is movable in response to the presence or absence of a mould at the respective mould-receiving station.

4. The press defined in claim 1, wherein the scanners and actuators are disposed beneath the turntable.

5. The press defined in claim 1, wherein the scanners are also adapted to initiate the operations at the respective operating stations.

6. The press defined in claim 5 including limiting switches provided at the operating stations for coupling said Maltese cross mechanism after termination of the respective operation at the operating station, said limiting switches being connected so that said Maltese cross mechanism can be coupled only when the operation has been completed at each operating station.

7. The press defined in claim 1, wherein said Maltese cross mechanism comprises a slotted plate fixed to the turntable, and a drive arm engaging said slotted plate, and a worm drive connected to said motor by way of said clutch and brake device and having an output shaft having seated thereon said drive arm.

8. The press defined in claim 7, wherein said drive arm is a double-acting drive arm, each end of which carries a roller engageable with said slotted plate.

9. The press defined in claim 1, wherein the operating station for charging the moulds is associated with a selector switch which is operable in two end steps and an intermediate step and carries two of said scanners, which co-operate selectively with either of two adjacent mould-receiving stations at the two end steps and with neither at the intermediate step.

10. The press defined in claim 9, comprising one said selector switch on each side of said operating station for pressing the glass, the two selector switches being intercoupled so that one is at the intermediate step when the other is at either end step.

11. The press defined in claim 1, wherein the operating station for withdrawing the glass product is displaceable in relation to said turntable in steps equal to the angular spacing between two adjacent mould-receiving stations.

12. The press defined in claim 11, wherein the operating station for withdrawing the mould is displaceable by a boom pivotable at the centre of said turntable.

* * * * *